United States Patent
Moon

(10) Patent No.: US 6,963,686 B2
(45) Date of Patent: Nov. 8, 2005

(54) OPTICAL FIBER CABLE FOR AIR-BLOWN INSTALLATION

(75) Inventor: Seung-Hyun Moon, Kumi (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 10/764,115

(22) Filed: Jan. 23, 2004

(65) Prior Publication Data

US 2004/0240810 A1 Dec. 2, 2004

(30) Foreign Application Priority Data

May 27, 2003 (KR) .................... 10-2003-0033754

(51) Int. Cl.⁷ .................................... G02B 6/44
(52) U.S. Cl. ............................... 385/113; 385/111
(58) Field of Search .................. 385/113, 111, 385/109

(56) References Cited

U.S. PATENT DOCUMENTS

| | | | | | |
|---|---|---|---|---|---|
| 4,317,000 A | * | 2/1982 | Ferer | .................... | 174/70 R |
| 4,522,464 A | * | 6/1985 | Thompson et al. | .......... | 385/107 |
| 4,534,618 A | * | 8/1985 | Bruggendieck | .............. | 385/102 |
| 5,125,062 A | * | 6/1992 | Marlier et al. | ............... | 385/101 |
| 5,229,851 A | * | 7/1993 | Rahman | ..................... | 385/114 |
| 6,195,488 B1 | * | 2/2001 | Song | ............................ | 385/101 |
| 6,349,161 B1 | * | 2/2002 | Gleason et al. | .............. | 385/113 |
| 6,496,629 B2 | * | 12/2002 | Ma et al. | ..................... | 385/113 |

* cited by examiner

*Primary Examiner*—Hae Moon Hyeon
(74) *Attorney, Agent, or Firm*—Cha & Reiter, L.L.C.

(57) ABSTRACT

An optical fiber cable for air-blown installation includes optical fibers acting as a medium for transmitting optical signals; a tube binding the optical fibers; string fillers surrounding the outer periphery of the tube at a predetermined spacing, tensile members positioned between the string fillers to surround the outer periphery of the tube for improving the tensile force of the optical fiber cable; and an outer sheath formed in a flexuous shape to surround the outer circumferences of the string fillers and the tensile members.

14 Claims, 4 Drawing Sheets

US 6,963,686 B2

OPTICAL FIBER CABLE FOR AIR-BLOWN INSTALLATION

CLAIM OF PRIORITY

This application claims priority to an application entitled "optical fiber cable for air-blown installation," filed with the Korean Intellectual Property Office on May 27, 2003 and assigned Ser. No. 2003-33754, the contents of which are hereby incorporated by reference.

BACKGROUND OF THE INVENTION

1. Field of the Invention

The present invention relates to an optical fiber cable, and more particularly to an optical fiber cable for air-blown installation between a telephone office and a subscriber network.

2. Description of the Related Art

An optical fiber cable serves as a medium for transmitting optical signals through optical fibers. It includes optical fibers, tensile members, a waterproof member and an outer sheath to protect and improve the physical characteristics of the stranded optical fibers. The optical fiber is a glass wire which is made from material such as silica, mainly from quartz, and is easy to handle and install since its diameter is as small as that of a hair. The optical fiber includes a core for transmitting light therein, a clad for confining the light propagating within the core, and a sheath for surrounding the clad.

Optical fiber has have many advantages over coaxial cable, but is problematic in that optical fiber is susceptible to physical and environmental effects. Accordingly, optical fiber cables, which have superior physical characteristics and installation efficiency in comparison with those of the optical fiber, have become widespread. Specifically, indoor optical fiber cables are generally used as networks for connecting telephone offices as well as means for connecting subscribers.

FIG. 1 shows a prior art optical fiber cable having a central tensile member 110 positioned at the center thereof, a plurality of tubes 120 arranged about the central tensile member 110, an outer sheath 130 binding the tubes 120 and the central tensile member 110. The cable further includes rip codes 140 positioned in an empty space between the tubes 120 and on the inner wall of the outer sheath 130.

The central tensile member 110 provides the optical fiber cable with a tension-resistant force and is positioned at the center thereof. The central tensile member 110 may be made from a material such as an FRP (fiberglass reinforced plastic).

Each of the tubes 120 has a plurality of tight-coated optical fibers 120 stranded therein and a filler 122 such as strands of aramid yarn to occupy the empty space. The filler prevents moisture from penetrating into the tubes 120 and relieves any shock applied to the optical fibers 121.

The outer sheath 130 is positioned at the outermost side of the optical fiber cable and is made of a polymer compound such as a PVC (polyvinyl chloride) or a PE (polyethylene). The outer sheath 130 is formed by an extrusion process.

The rip codes 140 are positioned in the empty space between the tubes 120 or on the inner wall of the outer sheath 130 to easily peel off the optical fiber cable. The rip codes 140 may be made of aramid yarn or glass yarn.

Shortcomings of the above-described optical fiber cable include undesired contraction during a change in external surroundings, such as a sudden temperature drop. Also, tensile force during installation in insufficient, because the cable is limited to a single central tensile member.

In an effort to overcome the above-mentioned problem, an optical fiber cable having a plurality of tensile members has been proposed. FIG. 2 shows an optical fiber cable that includes a ribbon tube 210 mounted at the center thereof, a plurality of tensile members 230 positioned around the ribbon tube 210 at a predetermined spacing, and an outer sheath 240 binding the ribbon tube 210 and the tensile members 230.

Within the ribbon tube 210 is a bundle 220 of ribbon optical fibers surrounded by a filler 211. The bundle 220 of ribbon optical fibers is formed by laminating ribbon optical fibers 211 having multi-cores. The ribbon optical fibers 221 are formed by arranging a plurality of optical fibers 221a in a line, applying an UV curing agent thereon, and curing the agent. The empty space of the ribbon tube 210 is filled with a filler 211, such as a jelly compound, acting as a waterproof substance.

The tensile members 230 are positioned on the outer periphery of the ribbon tube 210 at a predetermined spacing and provide the ribbon tube 210 with a tension-resistant force. The outer sheath 240, positioned at the outermost side of the optical fiber cable, is formed by an extrusion process.

However, the optical fiber cable cannot be easily installed in a crooked pipeline or a curved pipeline due to poor flexibility caused by the tensile members.

SUMMARY OF THE INVENTION

The present invention, which has been made to solve the above-mentioned problems, provides an optical fiber cable, which can be easily installed and which resists deformation that might otherwise be induced by external surroundings, such as contraction caused by a temperature drop.

In one aspect of the present invention, an optical fiber cable includes optical fibers acting as a medium for transmitting optical signals, a tube binding the optical fibers, string fillers surrounding an outer periphery of the tube at a predetermined spacing, tensile members and an outer sheath. The tensile members are positioned between the string fillers to surround the outer periphery of the tube and improve the tensile force of the optical fiber cable. The string fillers and tensile members are curved in cross-section and have respective radially outer surfaces that collectively define an outer surface for the string fillers and tensile members as positioned around the tube. The outer sheath is formed in a flexuous shape to surround the outer surface of the string fillers and tensile members.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF THE PREFERRED EMBODIMENT

Hereinafter, optical fiber cables for air-blown installation according to preferred embodiments of the present invention will be described with reference to the accompanying drawings. In the following description of the present invention, detailed description of known functions and configurations incorporated herein will be omitted for clarity.

Figure 1:
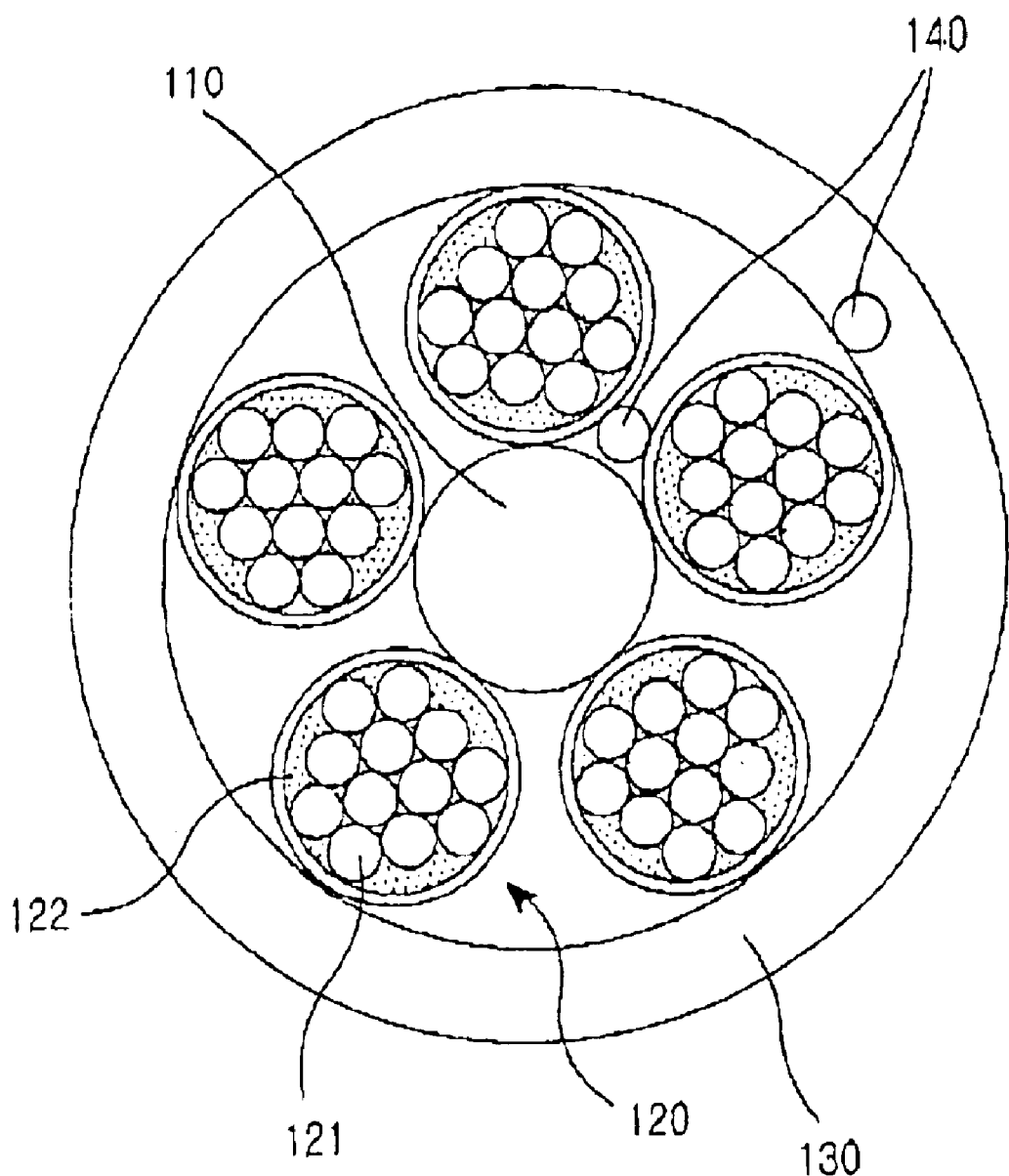
FIG. 1 is a sectional view of an optical fiber cable comprising a plurality of tubes according to the prior art.
Figure 2:
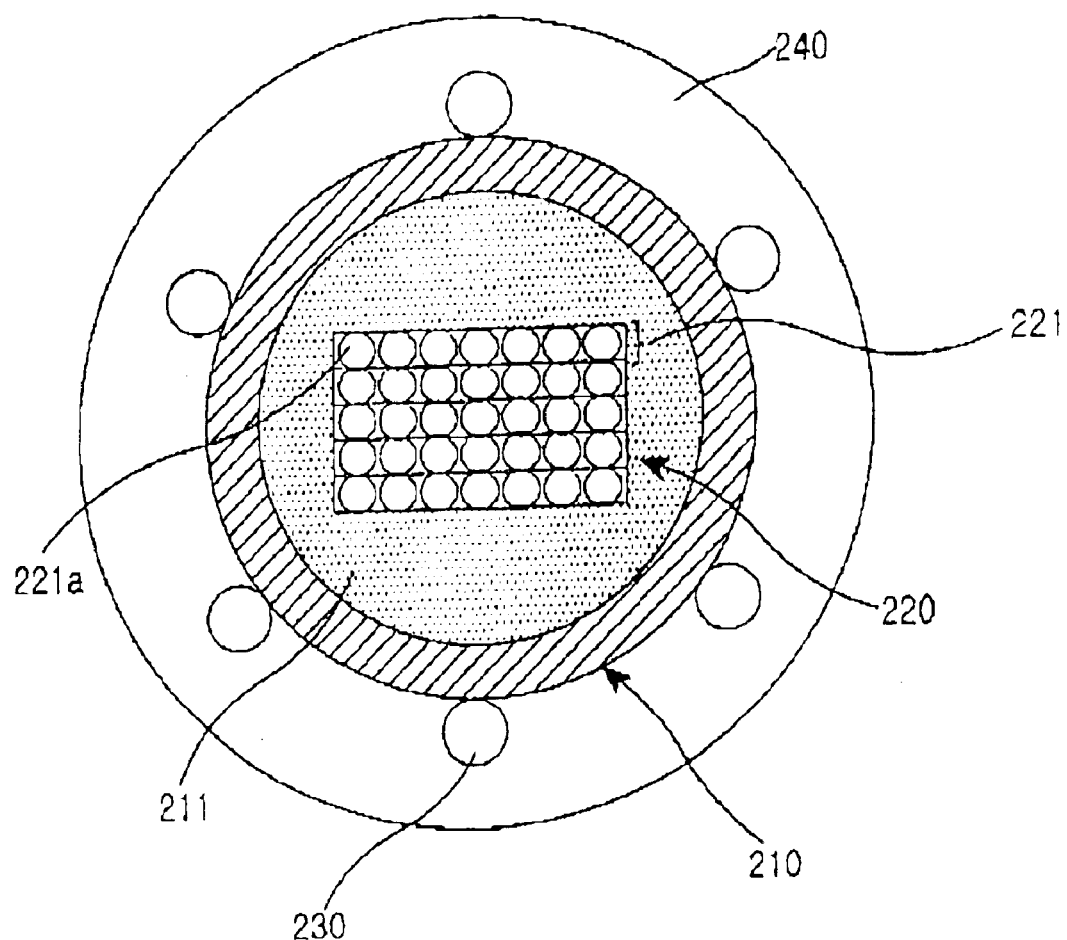
FIG. 2 is a sectional view of an optical fiber cable comprising a bundle of ribbon optical fibers.
Figure 3:
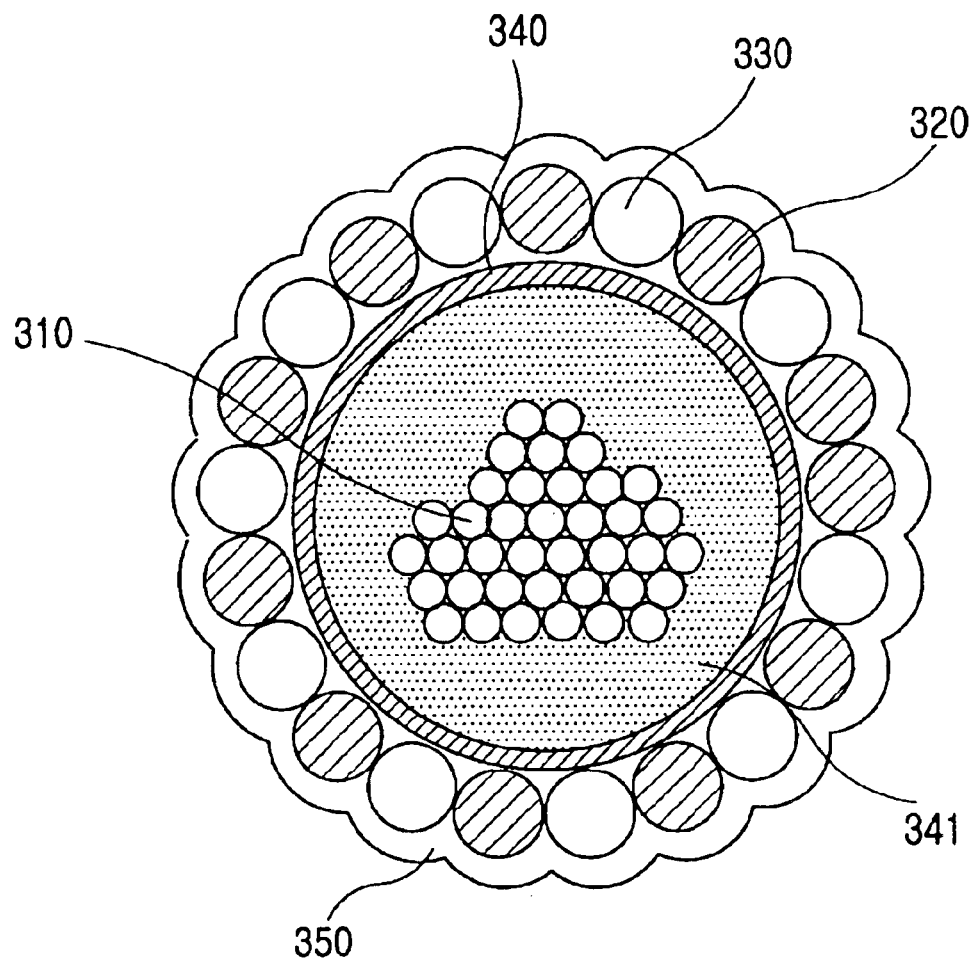
FIG. 3 is a sectional view of an optical fiber cable with a uni-tube structure that features a plurality of optical fibers according to a preferred embodiment of the present invention.

FIG. 3 shows the constitution of an optical fiber cable with a uni-tube structure featuring a plurality of optical fibers according to a preferred embodiment of the present invention. The optical fiber cable includes a plurality of optical fibers 310 acting as a medium for transmitting optical signals; a tube 340 binding the optical fibers 310; a plurality of string fillers 330 surrounding the outer periphery of the tube 340; a plurality of tensile members 320 positioned between the string fillers 330 to surround the outer periphery of the tube 340; and an outer sheath 350.

The optical fibers 310 act as a medium for transmitting optical signals and are mounted within the tube 340. The empty space between the tube 340 and the optical fibers 310 is filled with a gel filler 341, such as a jelly compound.

The optical fiber cable according to the present invention is also applicable to a tube structure of a "dry" type or a "tight buffer" type, whose tube is not filled with a gel filler.

The string fillers 330 surround the outer periphery of the tube 340 at a predetermined spacing. The string fillers 330 are composed of a polymer material so that the optical fiber cable is provided with a tensile force and is kept in a flexible state at the same time.

The tensile members 320 are positioned between the string fillers 330 to surround the outer periphery of the tube 340 for improving the tensile force of the optical fiber cable. The tensile members 320 are composed of a mixture of an FRP and an UV curing agent. The content of the FRP in the total mixture is less than 95%. This provides the optical fiber cable with a tensile force which is necessary during air-blown installation and, at the same time, improves flexibility for easy installation.

The string fillers 330 and the tensile members 320 are stranded in an S-Z form or in a helical form along the outer periphery of the tube 340. This improves the tension-resistant force and tensile force against any physical impact from outside. The arrangement and number of the string fillers 330 and the tensile members 320 can be modified in a variety of way according to their applications. Detailed descriptions on the optical fiber cable whose tubes are arranged in the S-Z form, as mentioned above, is described in U.S. Pat. No. 4,828,352 to Heinrich A. Kraft, entitled "S-Z STRANDED OPTICAL CABLE", the whole contents of which are incorporated herein by reference. Accordingly, detailed description on the string fillers and tubes stranded in the S-Z form has been omitted.

The outer sheath 350 is formed into a flexuous shape by an extrusion process to surround the outer circumferences of the string fillers 330 and the tensile members 320, so that the air-blown installation of the optical fiber cable can be easily performed. As shown, the string fillers 330 and tensile members 320 are curved in cross-section, and have respective radially outer surfaces that collectively define an outer surface for the fillers and members as positioned around the tube. The outer sheath 350 is formed with an outer surface that in cross-section is flexuous in correspondence with the outer surface of the fillers and members. The outer sheath 350 may be made from material such as a PE polymer-based material.

Figure 4:
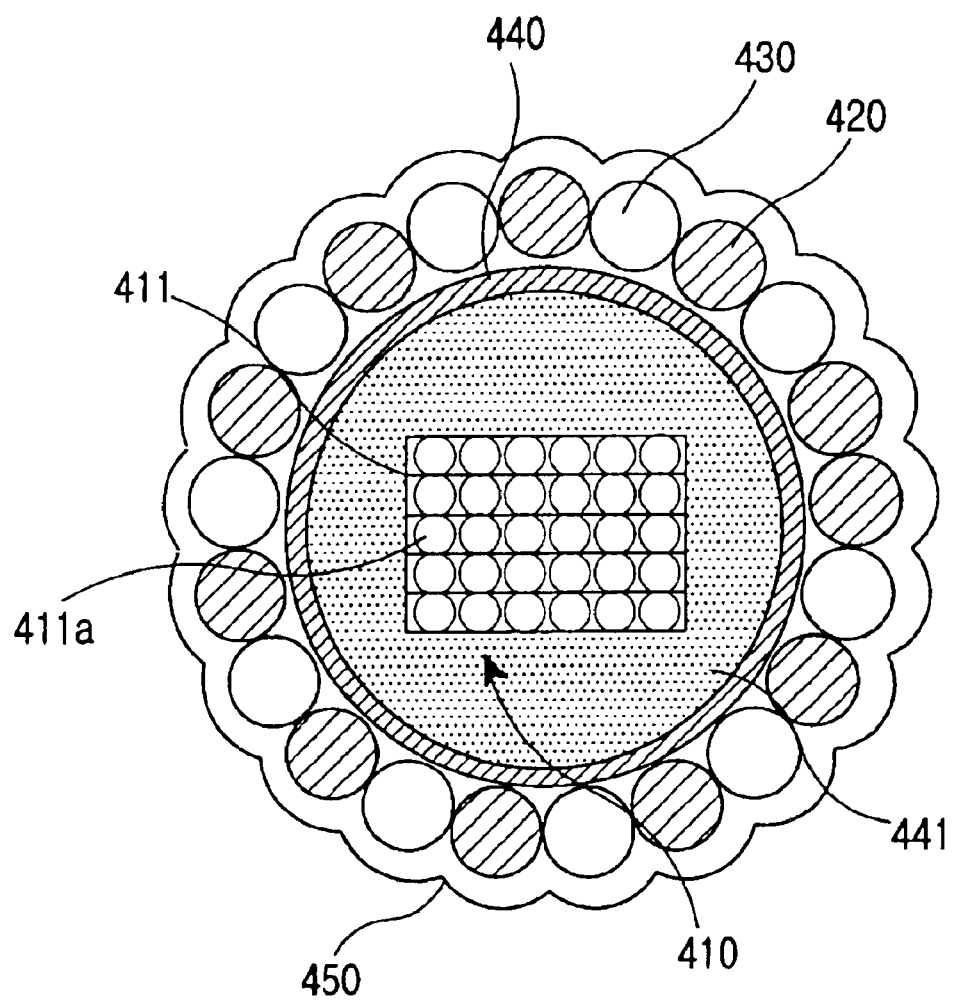
FIG. 4 is a sectional view of an optical fiber cable featuring a bundle of ribbon optical fibers in accordance with another embodiment of the present invention.

FIG. 4 shows an optical fiber cable featuring a bundle of ribbon optical fibers according to another embodiment of the present invention. The optical fiber cable includes: a bundle 410 of ribbon optical fibers; a tube 440 binding the bundle 410 of optical fibers; a plurality of string fillers 430 surrounding the outer periphery of the tube 440; a plurality of tensile members 420 positioned between the string fillers 430 to surround the outer periphery of the tube 440; and an outer sheath 450 formed in a flexuous shape.

The bundle 410 of ribbon optical fibers is formed by laminating ribbon optical fibers 411, applying an UV curing agent thereon, and curing the agent. The ribbon optical fibers 411 are formed by arranging the optical fibers 411a in a line, applying an UV curing agent thereon, and curing the agent. The bundle 410 of ribbon optical fibers is mounted within the tube 440.

The tube 440 binds the bundle 410 of ribbon optical fibers. The empty space between the tube 440 and the bundle 410 of ribbon optical fibers is filled with a gel filler 441, such as a jelly compound. The tube 440 may be composed of a polymer compound such as a PVC.

The string fillers 430 surround the outer periphery of the tube 440 at a predetermined spacing. The string fillers 430 may be composed of a polymer material. The string fillers 430 provide the optical fiber cable with a tensile force and keep it in a flexible state at the same time.

The tensile members 420 are positioned between the string fillers 430 to surround the outer periphery of the tube 440 for improving the tensile force of the optical fiber cable. The tensile members 420 are composed of a mixture of an FRP and an UV curing agent.

The string fillers 430 and the tensile members 420 are stranded in an S-Z form or in a helical form along the outer periphery of the tube 440. This improves the tension-resistant force and tensile force against any physical impact from outside.

The outer sheath 450 is formed into a flexuous shape by an extrusion process to surround the outer circumferences of the string fillers 430 and the tensile members 420, so that air-blown installation of the optical fiber cable can be performed easily. The outer sheath 450 is positioned at the outermost side of the optical fiber cable and may be made of a polymer compound such as a PVC or a PE. The outer sheath 450 is formed by an extrusion process. The outer sheath 450 may have rip codes (not shown) mounted adjacent its inner wall to easily peel off the optical fiber cable.

The inventive construction which interposes string fillers, made of a polymer material, between tensile members positioned on the outer periphery of a tube advantageously prevents contracting of the optical fiber cable due to a temperature drop. The design also allows the cable to maintain its flexibility, which is necessary during installation. Furthermore, the flexuous shape of the outer sheath affords easy air-blown installation of the optical fiber cable.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. An optical fiber cable for air-blown installation, comprising:
    a plurality of optical fibers acting as a medium for transmitting optical signals;
    a tube having a radially outer surface binding the optical fibers;

a plurality of string fillers surrounding an outer periphery of the tube at a predetermined spacing;

a plurality of tensile members positioned between the string fillers to surround the outer periphery of the tube for improving the tensile force of the optical fiber cable, the string fillers and tensile members being curved in cross-section, having respective radially outer surfaces that collectively define an outer surface for the string fillers and tensile members as positioned around the tube, and being stranded in an S-Z form along the tube outer surface; and an outer sheath formed in a flexuous shape to surround said outer surface for the string fillers and tensile members.

2. The cable of claim 1, wherein the outer sheath is formed with an outer surface that in cross-section is flexuous in correspondence with said outer surface of the string fillers and tensile members.

3. The cable of claim 2, wherein the tube, string fillers and tensile members are formed generally circular in cross-section.

4. The cable of claim 1, wherein the string fillers and the tensile members are stranded in a helical form along the tube outer surface.

5. The cable of claim 1, wherein the tensile members are made from a mixture of fiberglass reinforced plastic (FRP) in the range of less than 95% and an UV curing agent.

6. The cable of claim 1, wherein the string fillers are made from a polymer material which provides the optical fiber cable with expandability and a tension-resistant force.

7. The cable of claim 1, wherein the outer sheath is made from a polyethylene (PE) polymer-based material.

8. The cable of claim 1, wherein an empty space between the tube and the optical fibers is filled with a gel filler.

9. An optical fiber cable for air-blown installation, comprising:

a bundle of optical fibers formed by laminating a plurality of optical fiber ribbons acting as a medium for transmitting optical signals;

a tube having a radially outer surface binding the bundle of optical fibers;

a plurality of string fillers surrounding an outer periphery of the tube at a predetermined spacing;

a plurality of tensile members positioned between the string fillers to surround the outer periphery of the tube for improving the tensile force of the optical fiber cable, the string fillers and tensile members being curved in cross-section and having respective radially outer surfaces that collectively define an outer surface for the string fillers and tensile members as positioned around the tube, and being stranded in a helical or S-Z form along the tube outer surface; and an outer sheath formed in a flexuous shape to surround said outer surface for the string fillers and tensile members.

10. The cable of claim 9, wherein an empty space between the tube and the optical fibers is filled with a gel filler.

11. The cable of claim 9, where the outer sheath is formed with an outer surface that in cross-section is flexuous in correspondence with said outer surface of the string fillers and tensile members.

12. The cable of claim 11, wherein the tube, string fillers and tensile members are formed generally circular in cross-section.

13. A method for forming an optical fiber cable for air-blown installation, comprising the steps of:

providing a plurality of optical fibers acting as a medium for transmitting optical signals;

providing a tube binding the optical fibers;

surrounding, with a plurality of string fillers, an outer periphery of the tube at a predetermined spacing;

positioning a plurality of tensile members positioned between the string fillers to surround the outer periphery of the tube for improving the tensile force of the optical fiber cable, the string fillers and tensile members being curved in cross-section and having respective radially outer surfaces that collectively define an outer surface for the string fillers and tensile members as positioned around the tube;

stranding the string fillers and tensile members along stranded in a S-Z form along the tube outer surface; and providing an outer sheath formed in a flexuous shape to surround said outer surface for the string fillers and tensile members.

14. The method of claim 13, wherein the outer sheath providing step comprises the step of forming the outer sheath with an outer surface that in cross-section is flexuous in correspondence with said outer surface of the string fillers and tensile members.

* * * * *